Figure 1:
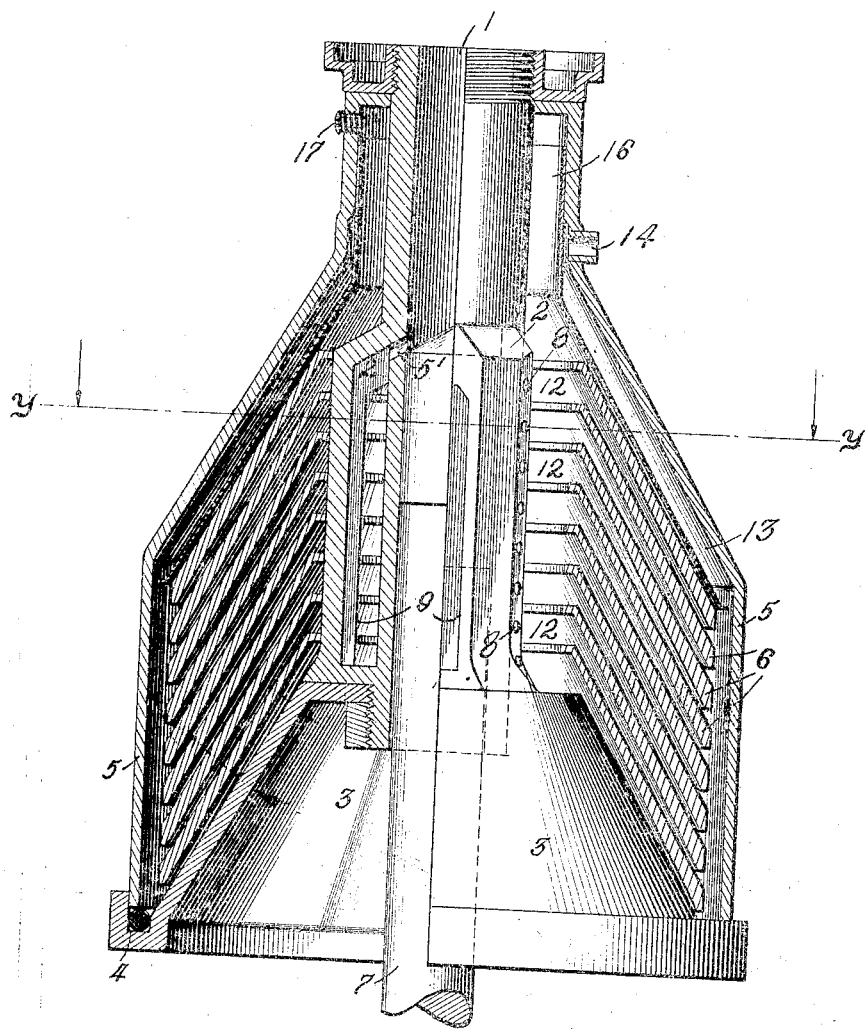

W. C. HARTMANN.
CREAM SEPARATOR.
APPLICATION FILED FEB. 19, 1910.

964,643.

Patented July 19, 1910.
2 SHEETS—SHEET 1.

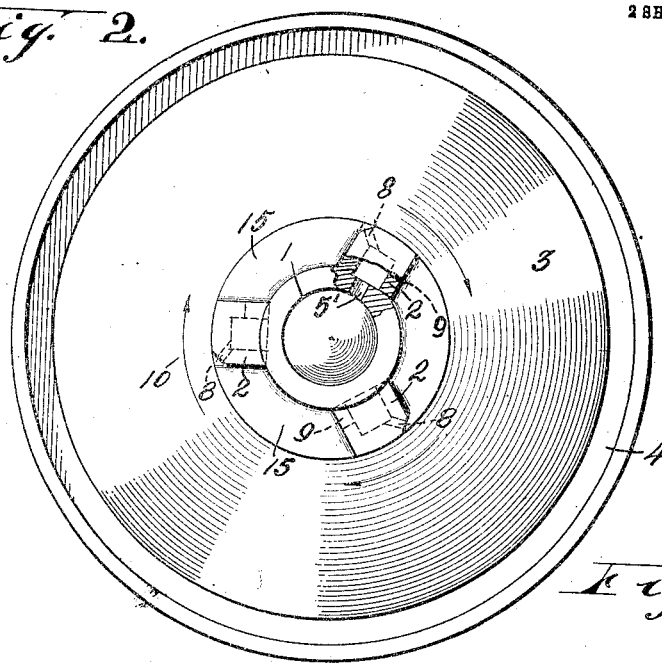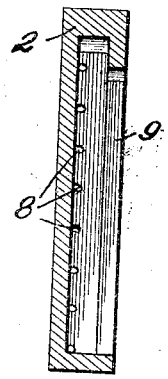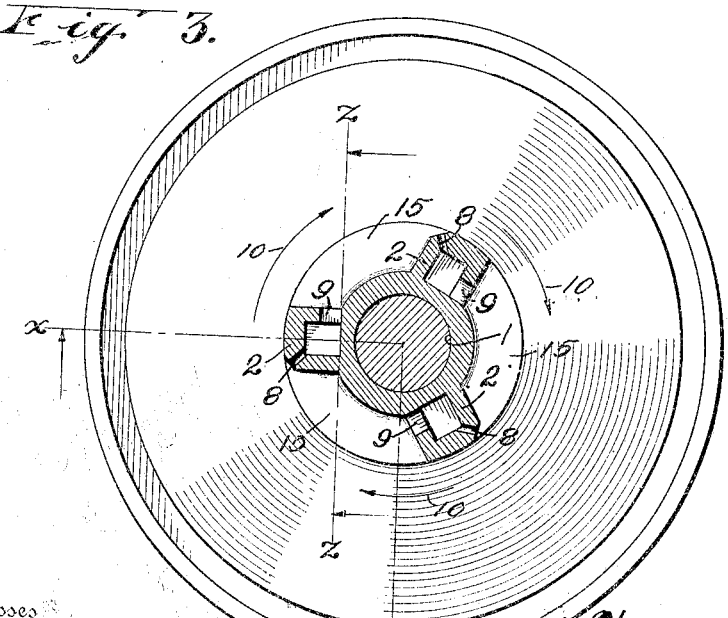

UNITED STATES PATENT OFFICE.

WILLIAM C. HARTMANN, OF MILWAUKEE, WISCONSIN, ASSIGNOR TO THE MILWAUKEE SEPARATOR CO., OF MILWAUKEE, WISCONSIN, A CORPORATION OF WISCONSIN.

CREAM-SEPARATOR.

964,643.   Specification of Letters Patent.   Patented July 19, 1910.

Application filed February 19, 1910. Serial No. 544,748.

*To all whom it may concern:*

Be it known that I, WILLIAM C. HARTMANN, a citizen of the United States, residing at Milwaukee, county of Milwaukee, and State of Wisconsin, have invented new and useful Improvements in Cream-Separators, of which the following is a specification.

My invention relates to improvements in that class of cream separators in which the separating cones are supported from and around the lower end of a revoluble central member, a milk receiving chamber is centrally located in the upper end of said central member, a plurality of vertical channels are supported from the periphery of and at the lower end of said central member, and radial ducts extend outwardly from the lower end of said milk receiving chamber to each of said vertical channels, whereby the unseparated milk is caused to flow outwardly of its own gravity from said central milk chamber into said channels before passing out through the radial apertures into the space between the separating cones and whereby, owing to the greater distance of said channels from the center of said milk chamber, the centrifugal action at such point is greatly increased, and the milk is caused to move with much greater velocity. My present improvement, however, pertains more especially among other things, to the peculiar construction of said vertical channels.

My invention is further explained by reference to the accompanying drawings, in which—

Figure 1 represents a vertical section, drawn on line x—x of Fig. 3, the right one-half of the central member being shown in full. Fig. 2 is a top view of the central member, part broken away. Fig. 3 is a transverse section of the central member, drawn on line y—y of Fig. 1, and Fig. 4 is a vertical section through one of the milk channels, drawn on line z—z of Fig. 3.

Like parts are identified by the same reference numerals throughout the several views.

The central member comprises the milk receiving chamber 1, the three vertical channels 2 and the conical base member 3, provided with the annular channel 4 for the reception of the lower end of the inclosing case 5, and the radial ducts 5' which communicate from the lower end of the milk chamber with the upper end of said vertical channels. 6, 6, represent a series of milk separating cones, which are supported, one above another, from and around the base member 3 in the ordinary manner. The central member, together with the inclosing case 5 are supported from the revoluble shaft 7 through and by which motion is communicated to said parts from the driving mechanism of the separator. Novelty of invention is predicated more especially, as stated, upon the peculiar construction of the vertical channels 2, which channels are cast or otherwise formed integral with the central member and are each provided at one of their outer corners with a vertical series of outlet apertures 8, 8, through which as the same is revolved, the milk is discharged by the centrifugal action of the machine. The vertical channels 2 are also provided at their inner corners upon the side opposite from said vertical series of apertures with a vertical slot 9.

It will be understood that the central member and the several coöperating parts are adapted to be rapidly revolved in the direction indicated by the arrows 10, shown in Figs. 2 and 3, whereby the heavier products of the milk are caused by its centrifugal action to be discharged with great velocity out through said apertures 8 in the opposite direction from that of rotation, while an additional impulse is communicated to the milk by contact of the air which is caused by such rotation to enter said vertical channels through the vertical slot 9. Thus it will be obvious that by the coöperation of the air thus admitted, and the centrifugal action of the milk produced by the rapid rotation of said channels, the discharge of the milk from such channels is greatly accelerated. A further object attained by the vertical slots is found in the fact that they provide easy access to said channels for the purpose of cleansing the same and for removing such foreign substances as might otherwise accumulate therein. It will also be understood that the milk which passes through the series of apertures 8 enters the spaces 12 between the respective cones, when it is caused by the centrifugal action, to pass downwardly and outwardly through such spaces and from thence upwardly through the space 13 between the periphery of said cones and the inclosing case 5 and from thence out through the duct 14 to the place of discharge, while the cream and other products of the milk of less specific gravity pass up through the spaces 15 between said vertical channels, thence through the channel 16 and from thence out through the ducts 17 to the place of discharge.

Having thus described my invention, what I claim as new, and desire to secure by Letters Patent, is—

1. In a cream separator of the described class, the combination of a revoluble central member provided at its upper end with a milk receiving chamber, a plurality of separating cones supported from and around said member a plurality of vertical channels having open communication with said milk receiving chamber projecting radially beyond the periphery of said central member and respectively provided upon one of their vertical sides with a vertical slot and upon the opposite side with a plurality of outlet apertures respectively registering with the spaces between said separating cones.

2. In a cream separator of the described class, the combination of a revoluble central member provided at its upper end with a milk receiving chamber and at its lower end with a plurality of vertical channels, radial ducts communicating between the lower end of said milk chamber and the upper ends of said vertical channels, and a plurality of separating cones supported from and around the lower end of said central member below said milk chamber, said vertical channels being respectively provided upon one side with a plurality of outlet apertures respectively registering with the spaces between said separating cones and upon their opposite sides with a vertical slot, all substantially as and for the purpose specified.

In testimony whereof I affix my signature in the presence of two witnesses.

WILLIAM C. HARTMANN.

Witnesses:
 JAS. B. ERWIN,
 ON. P. ERWIN.